(12) United States Patent
Wartenberg

(10) Patent No.: US 7,746,880 B2
(45) Date of Patent: Jun. 29, 2010

(54) METHOD AND ARRANGEMENT RELATING TO MESSAGING

(75) Inventor: Fredrik Wartenberg, Mölndal (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 271 days.

(21) Appl. No.: 12/093,282

(22) PCT Filed: Nov. 15, 2005

(86) PCT No.: PCT/EP2005/055995

§ 371 (c)(1),
(2), (4) Date: May 9, 2008

(87) PCT Pub. No.: WO2007/057049

PCT Pub. Date: May 24, 2007

(65) Prior Publication Data

US 2008/0225862 A1    Sep. 18, 2008

(51) Int. Cl.
*H04L 12/56* (2006.01)

(52) U.S. Cl. .................................................... 370/408
(58) Field of Classification Search .......... 370/400–410
See application file for complete search history.

(56) References Cited

U.S. PATENT DOCUMENTS

| 4,626,829 | A | * | 12/1986 | Hauck | 341/63 |
| 5,182,642 | A | * | 1/1993 | Gersdorff et al. | 375/240.01 |
| 5,262,878 | A | * | 11/1993 | Esserman | 358/453 |
| 6,826,626 | B1 | | 11/2004 | McManus | |
| 2002/0029227 | A1 | | 3/2002 | Multer et al. | |
| 2004/0103399 | A1 | * | 5/2004 | Agarwala et al. | 717/128 |

* cited by examiner

*Primary Examiner*—Thai D Hoang
(74) *Attorney, Agent, or Firm*—Michael G. Cameron

(57) ABSTRACT

An arrangement for handling control signal messaging in a distributed system comprising a number of sending nodes and a number of receiving nodes and implementing a control signaling communication protocol. The sending and/or receiving node is adapted to send and/or receive the current message as a compressed message comprising only the difference portion between a selected or preferred previous message and the current message and the unique identity of said previous message.

15 Claims, 10 Drawing Sheets

| UNIQUE MSG. ID (HASH VALUE) | MESSAGE TYPE | MESSAGE BODY |
|---|---|---|
| 0xAF3E | CARCONFIGURE | NWHEELS=4, MIRRORS=2, (LEFT=EL., CENTER=MAN.) SPEED=200 |
| 0xCEFD | CARDRIVE | SPEED=180 |
| 0xAB44 | CARCONFIGURE | NWHEELS=4, MIRRORS=2, (LEFT=EL., CENTER=MAN.) SPEED=200 |
| 0xCEF5 | CARDRIVE | SPEED=200 |

Fig. 5

METHOD AND ARRANGEMENT RELATING TO MESSAGING

FIELD OF THE INVENTION

The present invention relates to an arrangement for handling control signalling messaging in a distributed system comprising a number of sending nodes and a number of receiving nodes and which implements a control signalling communication protocol.

The invention also relates to a node in a distributed communication system adapted to at least send control signalling messages with a given syntax to other nodes and implementing a control signalling protocol.

Furthermore the invention relates to a method for sending a control plane signalling current message from a first, sending, node to a second node in a distributed communication system implementing a control plane signalling communication protocol. Further yet the invention relates to a method of receiving a control plane signalling current message from a first sending node, in a second receiving node in a low transport layer of an implemented control plane signalling protocol, in a distributed communication system.

STATE OF THE ART

Distributed communication systems of different types rely on both data and control signalling between the subsystem nodes of a system. A node is here taken to mean an arbitrary node or a base station, a mobile station, a client/server, different boards in a base station or more generally a sender and a receiver. Depending on the particular system requirements and the design of the system, the control plane signalling may actually constitute a performance bottleneck. In the art is known to prevent or reduce the negative effects, to the largest possible extent, of such bottlenecks through improving the hardware, for example through using higher bus-speeds or alternative communication channels, for example replacing a serial interface by a shared memory interface or by designing more optimized protocols for control signalling.

It is however not always possible or not even desirable for different reasons, for example for keeping down the costs or in order not increase the complexity etc., to provide any hardware modifications. The only way to handle increasing requirements in control plane signalling or to avoid the occurrence of bottlenecks, is then to optimize or modify the communication protocol or to perform general software optimization, which normally is not sufficient. However, many distributed communication systems are very complex, such as for example radio base stations, server/client database systems etc. and it can be very difficult and involve high costs to optimize the communication protocol and it may also affect many other system components which affects the system design as a whole. It is also highly important that the control plane signalling is stable and well tested in order to assure a reliable and stable performance of the system. Actually, modification of the design of a control plane communication protocol might involve redesign of a major part of the communication system and, as referred to above, potentially affect many system components since the control plane communication protocols normally are common for many components included in the system.

In today known systems a lot of redundant or highly redundant information is normally sent, which means that the available control plane signalling bandwidth is not efficiently exploited and that bottlenecks easily result.

SUMMARY OF THE INVENTION

What is needed is therefore an arrangement as initially referred to through which bottlenecks to a large extent can be avoided or through which the occurrence of bottlenecks can be reduced considerably a compared to in hitherto known systems.

An arrangement is also needed through which the control plane signalling can be optimized. Further an arrangement is needed through which the usage of the bandwidth available for control plane signalling can be optimized. Most particularly an arrangement is needed through which the above can be achieved without affecting or requiring modification of used protocols over even the creation of new signalling protocols. Most particularly an arrangement is needed through which control plane signalling can be optimized and bandwidth saved in an efficient manner and bottlenecks to a high extent can be avoided without affecting involved components. Even more particularly an arrangement as referred to above is needed which does not require any hardware modifications or particularly no substantial hardware modifications. Still further an arrangement through which one or more of the above mentioned objects can be achieved is needed which can be applied to even very complex systems. Still further an arrangement is needed which is easy to install and implement, which is flexible and which is non-expensive.

Most particularly an arrangement as referred to above is needed which does not require any redesign of the system or at least not of any considerable part of the system. Most particularly an arrangement is needed through which sending of redundant information can be avoided to a high extent.

A node as initially referred to is also needed through which one or more of the above mentioned objects can be achieved. Particularly a node acting as a sender or a node acting as a receiver or, most particularly, a node acting both as a sender and as a receiver is needed. A node is here taken to mean any sending or receiving node or device, for example a board in a base station, a client server, a mobile station, a web server (or any server) etc, or more generally a sending/receiving subsystem. Communication within one node is then communication between subsystems. It should however be noted that the concept node should not be configured with nodes in the syntax tree as discussed below, which also are denoted nodes or syntax tree nodes.

A method as initially referred to, through which one or more of the above mentioned objects can be achieved, is also needed.

Therefore an arrangement as initially referred to is provided in which at least a number said sending nodes comprise message compression selection means for, based on one of more criteria, determining or selecting which messages are to be compressed or can be compressed, message compression means for compressing selected messages, where said message compressing means are adapted to use a syntax of the control signalling protocol for compression, unique identity assigning means for at least assigning messages which are to be compressed with a unique identity, and message information storing means, for example a cache, but also any other appropriate storing means, for example comprising a table, in which messages are sorted depending on type, i.e. depending on which type they are of, under said assigned unique identity, and message recognition means for recognizing previous messages of the same type stored in said storing means, and message distinguishing means for establishing the difference portion or portions between one or more previous messages and a current message of the same type. Only the difference portion or portions between the current message and a selected previous message and the unique identity of said selected previous message is sent as a compressed current message.

Particularly a node at least acting as a sending node comprises unique identity assigning comprising unique identity calculation means for at least assigning messages which are to be compressed with a unique identity, whereby the unique identity particularly comprises a hash value. Particularly the storing means further comprises means for establishing and storing message type description information which is based on the syntax of the message and for linking the unique identity of a message to the type and to the message type description.

Even more particularly the node at least acting as a sending node comprises calculating means for calculating the difference between one or more previous messages of the same type, preferably all messages of the same type (in the storing means), and the current message. Particularly criterion defining means are provided for giving or keeping criteria concerning which previous messages that are to be used for calculation of the difference and even more particularly the criterion defining means are controllable. In one embodiment no further differences are calculated when a criterion has been fulfilled. Alternatively it is searched for the "best", smallest, difference. Most particularly the criterion defining means at least comprise criteria relating to establishing the amount and/or kind of difference that is acceptable, i.e. in order to select or establish which previous message that should be used as a previous message for admitting only the difference to be adhered to the unique identity of the previous message to form a compressed current message to be sent to a receiving node.

Particularly the criteria defining means comprise previous message selecting means adapted to select a preferred previous message. Most particularly the preferred previous message is a message between which and the current message, the difference is the smallest. The size in bytes may for example be used as a measure for the size of the difference. It should be clear that also other criteria are possible.

In an advantageous embodiment, a sending node also acts as a receiving node. Then it comprises reconstruction means for mapping a received compressed message to the corresponding previous message using the information in the message information storing means by implementing the unique identity contained the compressed message that is received from the sending node. Particularly, when acting as a receiving and/or sending node, it comprises message storing decision means for determining or establishing if or when information concerning a received message is to be stored into the message information storing means.

In a particularly advantageous implementation the message distinguishing means comprises difference calculation means for performing a message difference calculation based on a syntax representation of a current message and one or more previous messages.

In a preferred embodiment, for message compression/decompression, a particular message layer is introduced between higher level protocol layers and the transport layer of the communication protocol such that message compression/decompression is integrated transparently into an existing computing system.

Particularly the receiving and/or sending nodes comprise a radio base station, a board, e.g. a board in for example a Radio Base Station, a mobile station, a server, a web server, a client or similar.

In order to solve one or more of the problems as referred to above and to achieve one or more of the objects of the invention, a node in a distributed communication system as initially referred to is also provided. The meaning of node in this specification has already been discussed above and node should hence be interpreted broadly.

The node comprises control signalling message compression means, message compression selection means for determining or selecting, based on one or more criteria, which messages are to be compressed. Said compression means are adapted to use the syntax of a control signalling for compression of selected control signalling messages. Is also comprises message unique identity assigning means for providing messages to be stored in message information storing means with a unique identity and message information storing means for example comprising a table, in which storing means messages are sorted depending on message type, by means of the assigned unique identity and each message is linked to a message type description. I.e. the unique message type, but sorting is done depending on one hand (e.g. first), on message type, and on the other hand (second) depending on the assigned unique message ID. "First" and "second" is here merely given as a non-limiting example. Further message recognition means are preferably provided for recognizing messages of the same type and message distinguishing means for establishing the difference portion or portions, between a current, new message, and a number of previous messages of the same type. It is further adapted to, if one or more given criteria are met, send a current message as a compressed message comprising only the difference portion and the unique identity of the selected previous message.

In a particular embodiment the message selection means comprises a selection algorithm. The algorithm may be static but it may also be dynamic. Preferably the storing means comprises a cache for example adapted to hold a given number of messages only, or to hold messages for a given time period, or based on both these criteria. In a very specific embodiment it might also be so constructed that it holds messages of a certain type for a given time period or a given amount of messages of one or more other types or messages may be held according to other criterias. It is also possible to hold all messages for a given time period.

Particularly the identity assigning means comprises a unique identity calculation means for calculating a hash value for each message. Particularly said message type descriptions are based on message syntax and said storing means comprises means for linking each message to a message type description.

Particularly the message type description specifies which type or types of parameters a message comprises, and optionally one or more of the order in which the parameters are provided or to be sent, or the allowed (or prohibited) values of said parameters. The message distinguishing means particularly comprises calculating means for calculating the difference between current messages and any or at least a given number of previous messages of the same type. Criterion defining means are provided which are adapted to give/keep criteria concerning amount and/or type of difference that is required to determine whether a message can be sent as a compressed message or not. Particularly, if a given criterion is met, the difference is added to the unique identity of a selected or preferred previous message and the message is sent as a compressed message comprising the difference and the unique identity of the previous message. The criteria may also or alternatively relate to e.g. for how many messages the difference should be calculated, when calculation is to be stopped due to an acceptable difference having been found etc.

In a particular embodiment, the selected or preferred previous message is the or one of the messages differing the least from the current message, i.e. where the difference is smallest.

In advantageous implementations, the node further comprises a message reconstruction means in order to be able to also handle the reception of compressed messages. Hence, said message reconstruction means comprise recognition and decompressing means for detecting a received compressed message and for mapping the difference and the unique identity to the appropriate previous message using said message information storing means, and adding the difference to the found previous message. p The invention also discloses a method for sending a controlplane signalling current message rom a first, sending, node to a second node in a distributed communication system implementing a control plane signalling communication protocol. The method comprises the steps of; determining or selecting, based on a number of given decision criteria, if the message is compressible; if not, sending the message, if yes; establishing an unique identity for the message; establishing the type of the message; storing the message with a unique identity, the message type and a message description in message information storing means; establishing if there is any entry in the message information storing means relating to previous messages of the same type as a current message; if not, sending the message, if yes; calculating the difference between the current message and one or more previous messages of the same type; selecting, based on a given selection criteria, the closest previous message or preferred previous message; generating a compressed message comprising the unique identity of the closest previous message and the difference between the current message and the selected closest or preferred previous message, and sending the compressed message.

The decision criteria are particularly given by a decision criterion mechanism and may comprise a list of compressible message types. The decision criterion mechanism may also be based on a criterion stating that all messages are compressible. The decision criterion mechanism may comprise a dynamic or static algorithm for determining whether a message is compressible, for example based on length and/or type.

In an advantageous implementation, the step of establishing the unique identity comprises; calculating a hash value, said hash value uniquely defining the message. Moreover, advantageously the step of generating a compressed message comprises; using the syntax of the control plane signalling to provide a message description.

Also, advantageously, the step of calculating the difference comprises; representing the messages using a syntax tree comprising numbered nodes; using a rewriting scheme to express the difference based on said numbered nodes and for reconstruction of the message from the difference and a previous message. The difference calculation between a current and a previous message will result in a sequence of operations on the syntax tree which transforms the first, current, message to a second, compressed, message. The sequence constitutes the difference.

Still further the invention suggests a method for handling reception of a control plane signalling current message from a first sending node in a second receiving node in a low transport layer of an implemented control plane signalling protocol, in a distributed communication system. The method comprises the steps of; receiving a current message; establishing if the message is compressed, if yes, establishing the unique identity contained in the compressed message; using the unique identity to find the corresponding previous message, particularly using a message information storing means; decompressing the compressed current message using the previous message and the received difference based on the use of a syntax based message description in message information storing means; establishing, based on predetermined criteria if the current, decompressed, message is to be stored in the message information storing means, if not, sending the current message to a higher protocol layer; if yes, establishing a unique identity of the current message and storing the message with message type and unique identity into the message information storing means, and, passing the current message to a higher protocol layer.

It is a requirement that the receiving node comprises a message information storing means in which previous messages are stored and organized depending on message type and the unique identity uniquely defining each message, similar to the sending node, or, when a node act as both sender and receiver, the same message information storing means is used for implementation of both the compression and decompression.

BRIEF DESCRIPTION OF THE DRAWINGS

The invention will in the following be further described, in a non-limiting manner, and with reference to the accompanying drawings, in which:

FIG. 5 illustrates one example of a storing means implemented in a node according to the inventive concept.

DETAILED DESCRIPTION OF THE INVENTION

Figure 1:
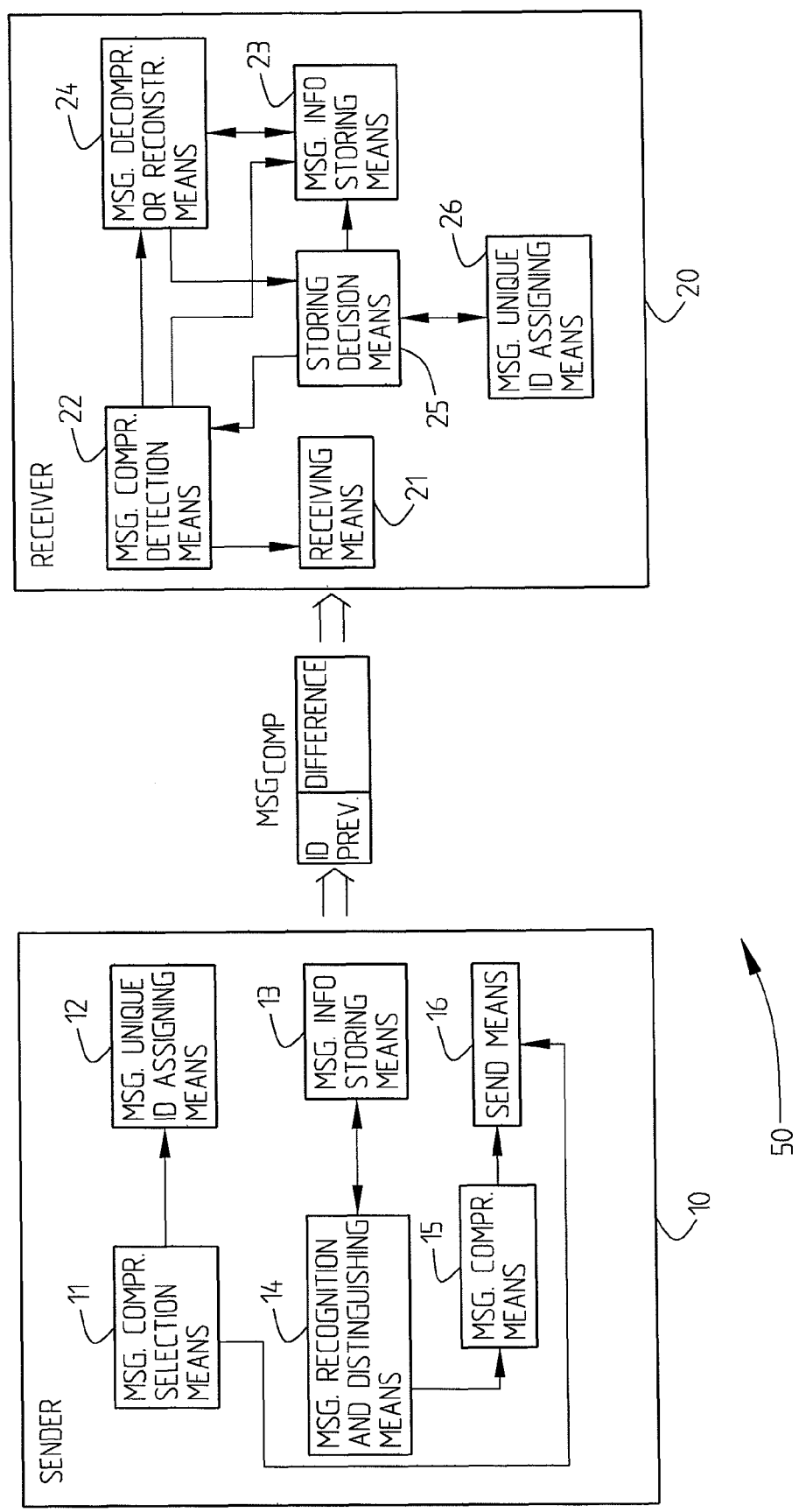
FIG. 1 is a very schematical block diagram of an arrangement or system comprising a sending node and a receiving node with control signal messaging handling means according to the present invention.

FIG. 1 very schematically illustrates an arrangement 50 or a system comprising a sender or a sending node 10 and a receiver or a receiving node 20. In this very simplified block diagram it is supposed that the sending node 10 is equipped in order to be able to send compressed messages whereas the receiving node 20 is supposed to be equipped so as to be capable of handling reception of compressed messages. The inventive concept is applicable in one direction or in both directions and of course such embodiments are included wherein a node only is capable of acting as a sending node or as a receiving node respectively for the purposes of the inventive concept. However, mostly a node is capable to handle compression as well as decompression. Such a node is very schematically illustrated in FIG. 2 to be more thoroughly discussed below.

It should be clear that a node here is taken to mean a node capable to act as a send for sending to other nodes and/or as a receiver for reception from other nodes, but also as a node within which sending and/or receiption can take place between node "sub-systems" or nodes acting as "sub-nodes".

It should be clear that the nodes shown in FIG. 1 by no means are complete and they merely contain those means that are necessary for the inventive concept; other properties or means normally included in a sending node or a receiving node are not shown for reasons of clarity but also because the sending and receiving nodes may be of many different kinds.

Hence the sending node 10 here comprises message compression selection means 11 which for example may include a dynamic or a static selection algorithm to select messages which are likely to be well compressible or which should be compressed. It may be based on one or more criteria. The criteria generally relate to the length of the messages and possibly also to the redundancy of the messages. It is also possible to select all messages as compressible and the actual criteria solely being whether there are any other messages of the same type etc., as will be more thoroughly explained below, in the message information storing means 13. Normally however, long messages with a high redundancy are selected. If a message is regarded as well compressible or selected as a compressible message, a message unique identity assigning means 12 is adapted to calculate a unique identity for the message. (It is also possible to calculate unique identities for all messages irrespectively of their being compressible or not, which however constitutes a less advantageous solution but which should not be excluded.) In a preferable implementation a hash value is calculated which allows unique identification of each message and a hash value is used as a message id.

An incoming compressible message (or, alternatively, also other messages) are then stored into message information storing means 13 which are adapted to sort the messages depending on type. The calculated unique identity, preferably the hash value, is then used as a message id under which the messages are stored in the message information storing means 13. The message information storing means 13, for example comprising a table, also links each message to a message syntax based message type description specifying how the message is built up, e.g. all the parameters that are sent as well as type of parameters and their allowed values, order of parameters, limits etc., also referred to as the message body. Message storing decision means may be provided as a separate means (not shown) or incorporated in the message information storing means 13 are provided for in any appropriate manner to enable building up of the table of message information storing means 13.

The sending node 10 also comprises message recognition and distinguishing means 14. By recognition is here meant that the type of the message is recognized and distinguishing is here meant the establishment of the difference between the message and previous messages of the same type. To perform these steps, the message recognition and distinguishing means 14 are required to cooperate with the message information storing means 13, i.e. to locate messages of the same type as a current message. For at least a number of the located message or messages, a difference is calculated between the stored message and a current message to be sent. Different criteria may be set to determine for which previous messages the difference is to be calculated, or for how many. Further it does according to given criterias, select one of the messages as closest message, or the preferred message. Normally it is the message which differs the least from a current message, although also other criteria may be implemented, for example if a message is found and the difference does not exceed a given value, such message can be selected as a preferred message or if the difference falls under a given limit, it may be used as a preferred message etc. Thus, if a preferred message is found, if for example the difference is small enough, the calculated difference (the difference is calculated by means comprising or constituting the distinguishing means), the calculated difference is attached to the corresponding message unique identity, i.e. the previous preferred message found in the message information storing means 13.

The message compressing means 15 are here seen substantially as an assembling means taking the difference from the recognition and distinguishing means and the unique identity from the message information storing means 13. This is merely a conceptual distinction that is made, the message compression means can also be seen as message compressing means 15 in communication with or comprising the message recognition and distinguishing means 14 and possibly also with the message information storing means 13, which preferably is a cache although it also may be some other storing means.

The hence compressed message is then forwarded to a sending means 16 for sending it to, for example, a receiving node which e.g. may be a receiving subsystem. Hence a compressed message $MSG_{comp}$ consisting of the unique identity of the selected previous message and the calculated difference is sent to a receiving node 20.

In this very simplified embodiment it is supposed that the receiving node 20 only assumes the functionality of a receiving node and hence only the means and functionalities required in order to support such a functionality are shown in the figure. Thus the receiving node 20 comprises compression detection means 22 receiving the message from receiving means 21. It is here supposed that the compression detection means are adapted to detect whether a message is compressed or not. In an alternative implementation a message may go directly to a message reconstruction means 24 in which, if it is established that it is not a compressed message, the message is simply forwarded. However in this particular embodiment it is supposed that the message reconstruction means 24 comprises means for, with the use of a message information storing means 23 similar to the one discussed with reference to the sending node 10, finding the previous message using the unique identity thereof and adding the difference to said previous message.

Preferably the receiving arrangement also comprises storing decision means 25 for determining whether a new reconstructed message should be stored under the relevant type in message information storing means 23 or not. It may also be used to determine whether a non-compressed received message should be stored into a message information storing means 23 or not. Alternatively all messages are stored. Many variations are possible. If however the storing decision means 25 decide that the message is to be stored, it has to communicate with unique identity assigning or calculation means 26 similar to the message unique identity assigning means 12 of the sending node 10. Decompressed or reconstructed messages can be stored under a unique identity in the message information storing means. As referred to above the process is applicable either in both directions or in one direction only.

Figure 2:
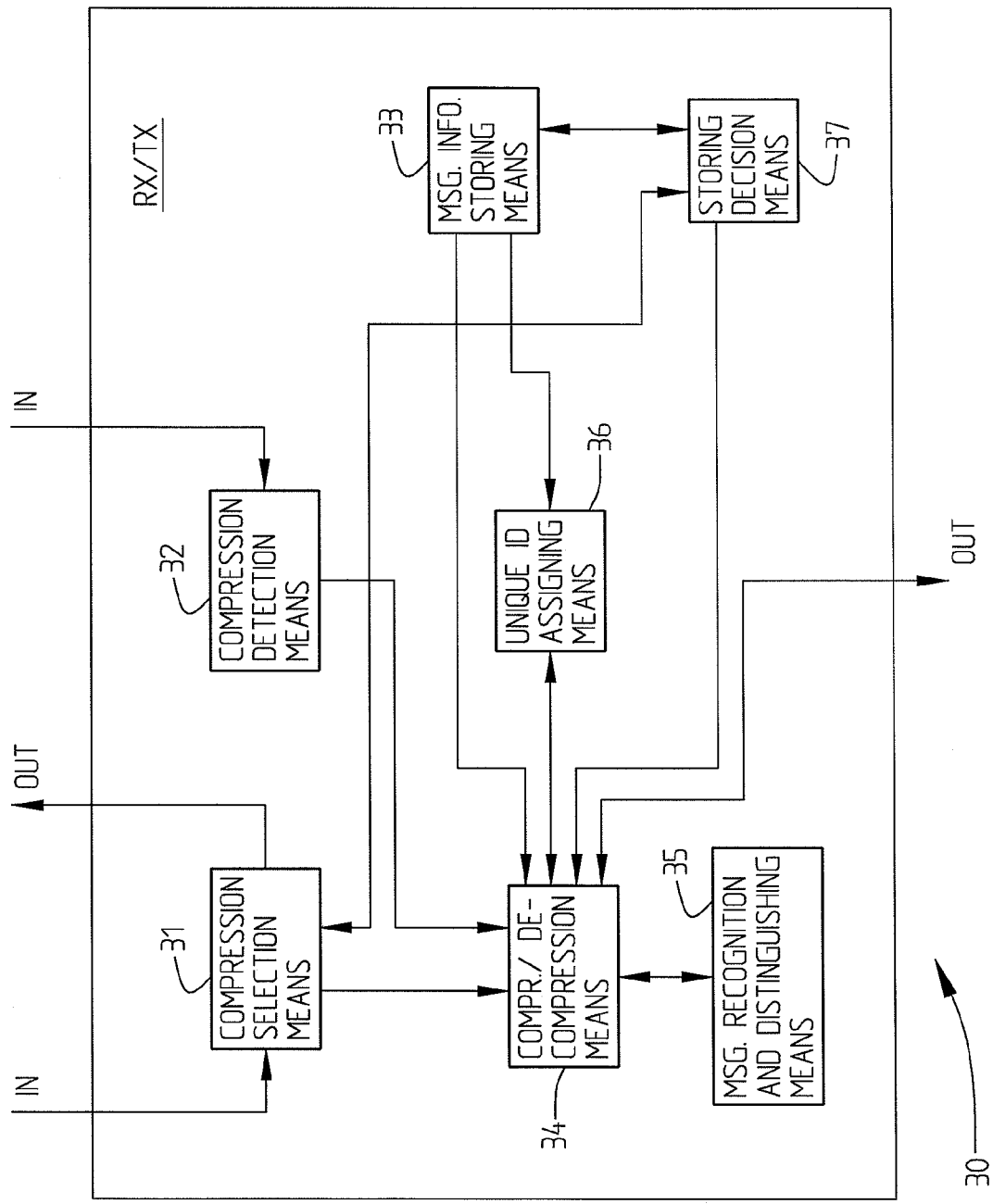
FIG. 2 is a very schematical block diagram illustrating a node acting as sender and receiver in which the inventive concept is implemented.

FIG. 2 very schematically illustrates a node 30 acting both as a sending node and as a receiving node (RX/TX). Only the means or functions which are required in order to perform compression/decompression for sending/receiving purposes according to the present invention are shown. Hence, as in FIG. 1 the node comprises message compression selection means 31 for selecting whether a message in convenient for compression or should be compressed. It is, when describing this figure, referred to the description of FIG. 1 in general. The sending/receiving node 30 further comprises compression detection means 32 for detecting whether an incoming message is compressed or not. The node comprises message information storing means 33 which are the same or substantially the same both for the receiving functionality and for the sending functionality. They are in communication with a storing decision means 37, cf. storing decision means 25 of FIG. 1. Common means for unique identity assigning 36 are provided which of course functions in the same manner irrespectively of whether it is for assigning an id to a decompressed message to be stored, or for any message to be stored. As in the preceding embodiment the unique identity assigning means 36 communicate with compression/decompression means 34 which here communicate with the message recognition and distinguishing means 35 as discussed with reference to FIG. 1 as well. They are here merely shown as one means but of course with two different functionalities. If a node acts as a receiver, a decompressed message is sent out to a higher layer of the communication protocol whereas if it is a message sending node, the message is sent out to a receiving node, via a lower layer of the communication stack.

The message recognition and distinguishing means 40 particularly comprises difference calculation means. Preferably the difference calculation is based on a syntax tree representation of the messages. Nodes in a syntax tree are numbered and a rewriting scheme is used to express the difference as well as for reconstructing the message from the difference and a previous message. For difference calculation and rewriting, the following operations on the syntax tree are defined: operation: here rewrite node (N I D,replacement); node NID here means node ID, i.e. a node address. Description of the operation: replace the contents of the referenced node N I D with replacement. Operation: Delete node (N I)D Description: delete the node N I.D Operation: add node (N I,D content). Description: adding of a node containing content after/under node NID.

In order to minimize the size of the difference operations should particularly be identified by a short numberic code, e.g. rewrite=1, delete=2, add node=3. It should be clear that this merely relates to one particular example. There are of course many other possibilities, particularly as far as the representation is concerned. The operations require referencing of the nodes of the syntax tree representation. In one particular, non-limiting, implementation, a two dimensional addressing scheme is used wherein the first dimension is the depth (e.g. starting with 1 for the root node, and increased with 1 for every level of children added. The second dimension may be a left-to-right numbering of all children on a specific level. The left-to-right ordering of the children needs to be deterministic and supported by the message syntax, which in practice particularly means that information elements of messages are ordered. It should however be clear that the invention is not limited to such a numbering scheme but that, of course, also other numbering schemes are possible.

It should be clear that the operations defined above require an unambiguous way to identify the content of a message, i.e. a way to address a node in a syntax tree.

Figure 3:
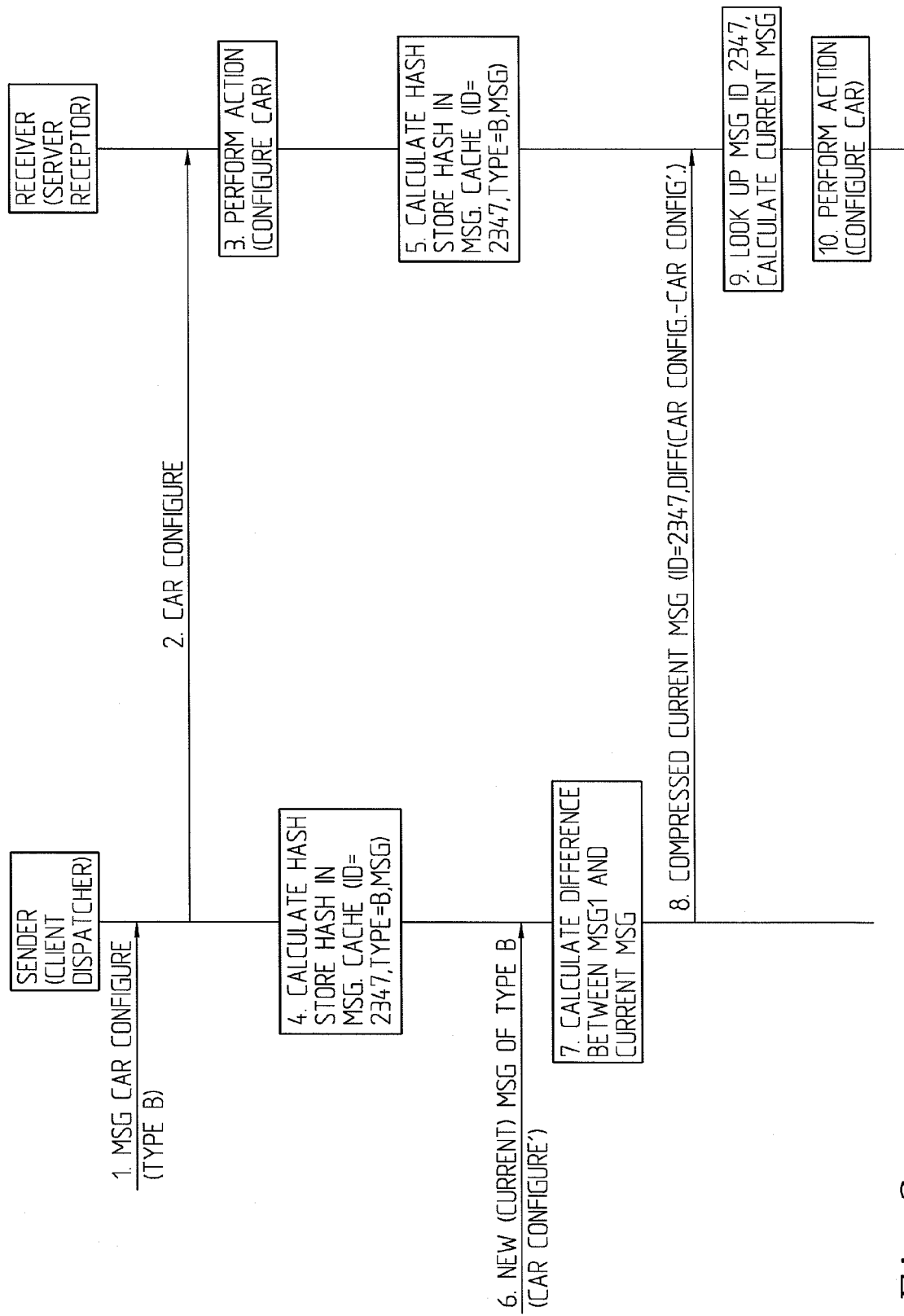
FIG. 3 shows an example of a signalling sequence in a system implementing message compression according to the present invention.

First, with references to FIG. 3 a signal flow scenario with message compression is illustrated between a sending side, here comprising a client dispatcher, for example a board in a base station, and a receiving side, here comprising a server receptor which for example may be a board in a base station. It is here supposed that a message 1, for example CarConfigure (of type B) is incoming to the client dispatcher, 1. It is here supposed that it is a message which is not compressible or that it is the first message of a given type etc; the figure merely intends to show that the message CarConfigure, 2, is sent to the server receptor. There the required action is performed, 3. In the sender a hash value is calculated, here for example with a unique identity ID=2347 and a storing operation is performed wherein the ID and type of the message or messages is stored in storing means, 4. Simultaneously or later the same operation is performed on the receiving side, 5.

At a later occasion it is supposed that a new or current message of type B arrives to the client dispatcher, 6. This message is denoted CarConfigure '. In the client dispatcher the difference is then calculated between the first message MSG 1 and the current message, both of type B, 7. The calculated difference is as described above together with the unique identity of message 1 sent to the server receptor, 8, i.e. the compressed current message with ID=2347, difference (CarConfigure-CarConfigure'). On the receiving side the message ID=2347 is looked up and in the storing means message MSG 1 is found. The current message is calculated through adding the difference to message 1, i.e. CarConfigure, 9. Subsequently the action in question is performed, here configure car, 10.

Figure 4:
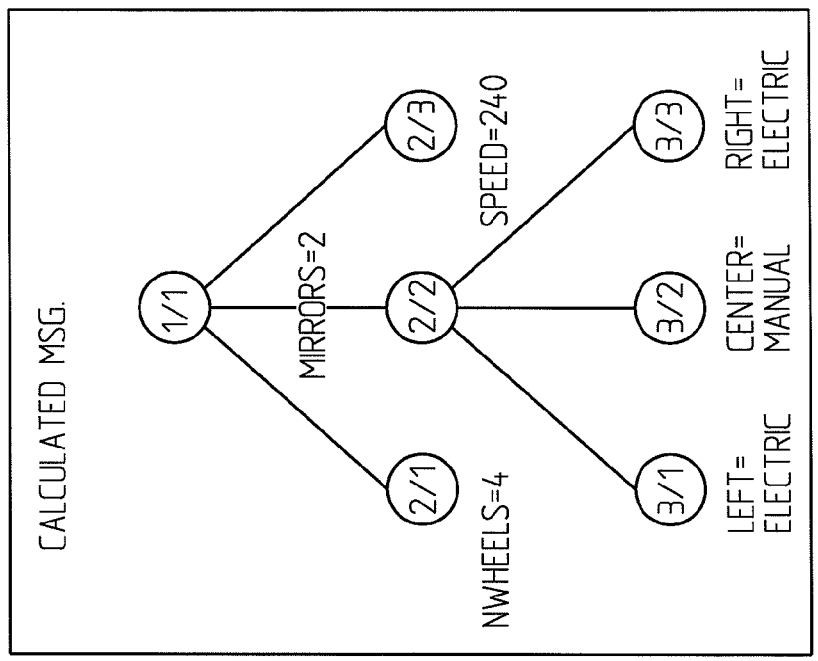
FIG. 4 shows an example of calculation and application of difference-, also denoted delta-, messages.
Figure 4:
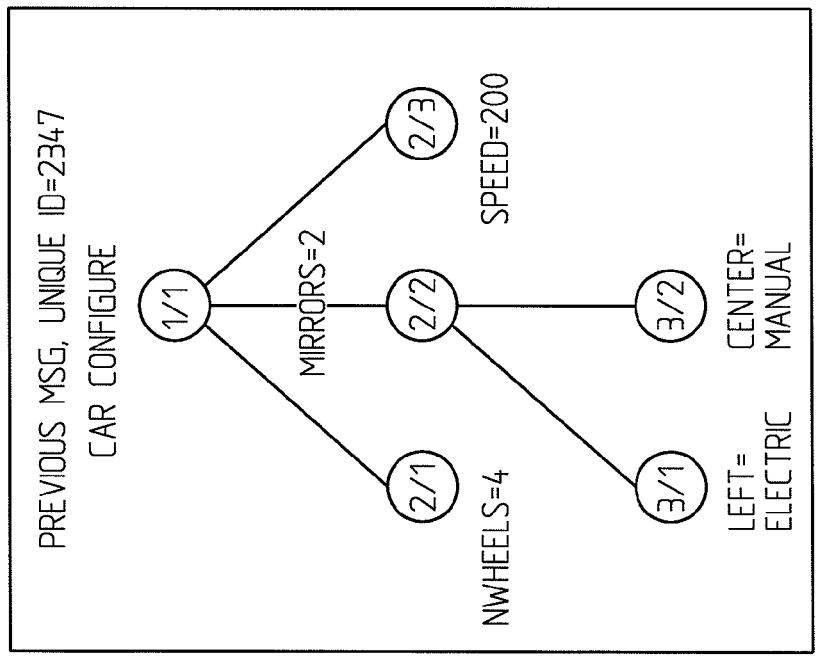

FIG. 4 shows an example for calculating and applying a difference message, in the following also denoted delta message. Nodes are addressed top down (first coordinate) and left to right (second coordinate). A message here is Car_Configure (nWheels=4, mirrors=2; [left=electric, center=manual], speed=200). The calculated new message with the difference or delta message added will be CarConfigure (nWheels=4, mirrors=3; [left=electric, center=manual, right=electric], speed=240). The delta message here is delta_message (ID=2347, add Node (3,3 right=electric), rewrite Node (2, 2, 240)).

The stored or previous message has identity 2347 as referred to above.

Often the message syntax restricts the range of allowed parameters in the messages. Such parameter ranges may be used to generate code books for message elements and thus reduce the number of bytes needed to transfer parameters. This can be applied to minimize the size of the transferred difference messages. It can also be applied to message sending without difference calculation.

Figure 6A:
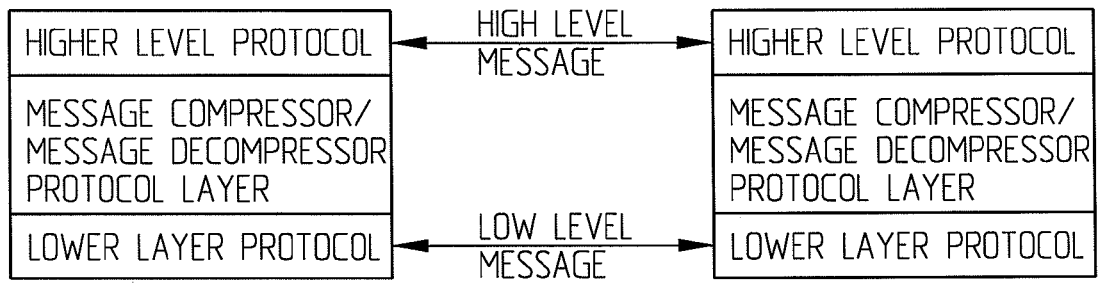
FIG. 6 illustrates transparent integration of message compression implemented in an existing distributed computing system through introduction of an additional message stack layer in the signalling protocol used.

FIG. 5 very schematically illustrates an example of message information storing means, for example a cache. In the storing means, for a message, the unique message identity, for example a calculated hash value, the type of the message and message body are stored. In the figure examples are given for the messages of type CarConfigure with a unique identity 0xAF3E and 0xAB44 and for a message type CarDrive a message with unique identity 0xCEFD and another with unique identity 0xCEF5. The message bodies include the message parameters. Advantageously the mechanism for message compression according to the inventive concept is integrated transparently into an existing distributed computing system. In order to achieve that, an additional messaging stack layer may be introduced between a higher level protocol layer, where messages are handled to lower transport layers, cf. FIG. 6A, and the transport layer, lower layer protocol. I.e. a protocol layer message compressor/message decompressor is introduced between the higher level protocol and the lower layer protocol. Transparent integration has the advantage that it minimizes the impact on existing system design and allows for later integration, for example during performance optimization. This is very advantageous since then the concept can be introduced in already existing systems. It may however, also be taken into account and introduced at the system design level, i.e. right from the very beginning. That makes the concept widely applicable, and easy to implement and it is not required to exchange entire systems or system components in order to take advantage of the inventive concept.

The inventive concept is very advantageous for applications with a considerable amount of complex control plane signalling, specially under conditions where communication bandwidth is a limiting factor. As examples can be given, Web services over Wireless Wide Area Networks, such as for example 3GPP (third Generation Partnership Project). Web Services use an XML-based protocol transported over HTTP for interaction between for example a mobile station and an application or a database server. Even if Web Services often mix control plane signalling and data traffic in a single message, pure or dominantly control plane signalling scenarios do also exist, for example for remote configuration of devices or exporting of device API:s (Application Programming Interfaces) to remote devices etc. Bandwidth in 3G networks is a very scarce resource while typically today's mobile devices have abundant computing resources both in terms of memory and MIPS. This is a gap which probably will increase even more in the soon future. An introduction of the inventive concept in such scenarios, would lead to the required bandwidth over the air interface being reduced considerably, especially as an XML data protocol has a very large potential for signal compression. As an example, a mobile application based on web services may access a server via some kind of a wireless connection, for example a 3G packet based service. The access comprises commands, for example search commands to a data-base server, and data transfer (for example transmission of retrieved search results). The inventive concept can be applied on sending/receiving of commands, and search commands may for example be redundant over time when new searches are modifications of previous searches. I.e. the concept may be implemented for a mobile device and a remote database.

Other possible applications are in radio base stations. Radio base stations are complex distributed systems with an enormous amount of control plane signalling between subsystems. Especially configuration signals for radio links often carry many parameters, most of which are not altered between subsequent signals. The inventive concept can provide for considerable bandwidth savings in such scenarios.

Figure 6B:
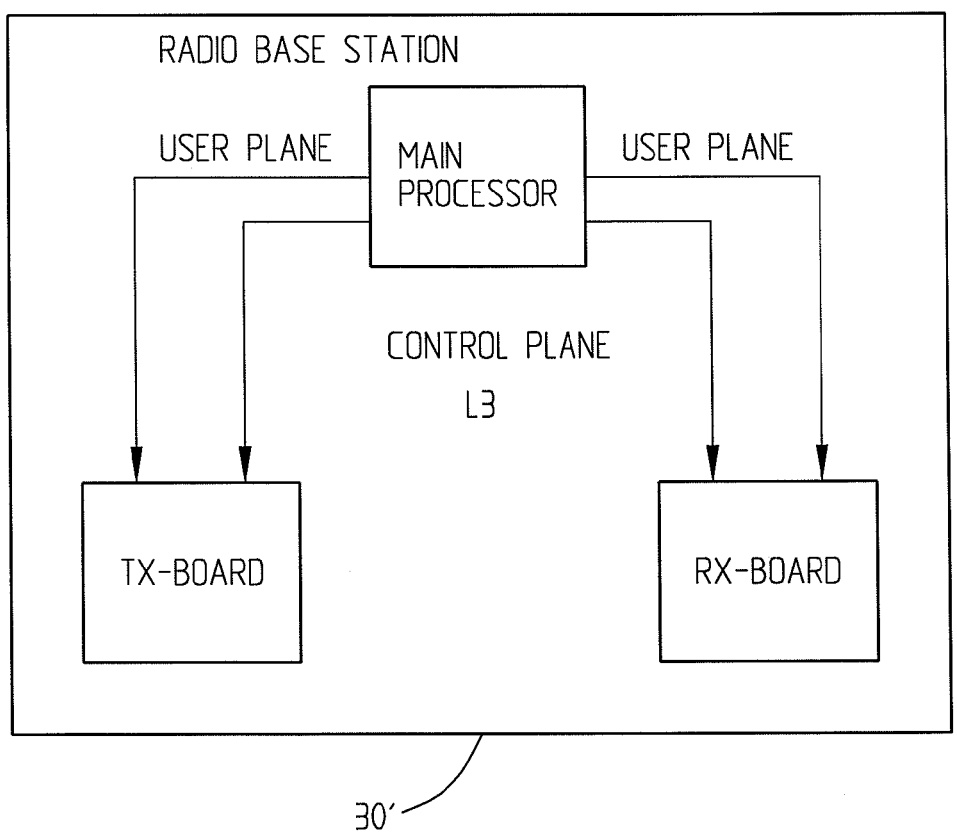

In one embodiment, schematically illustrated in FIG. 6B, message compression is integrated into the sending stack for layer 3 control plane signalling: transparent integration of message compression, higher layer level, layer 3, whereas lower layer is layer 2 of the main processor and it is used in signalling to the transmitter and receiver boards. User data flows are normally not suited for application of the inventive concept.

Figure 7:
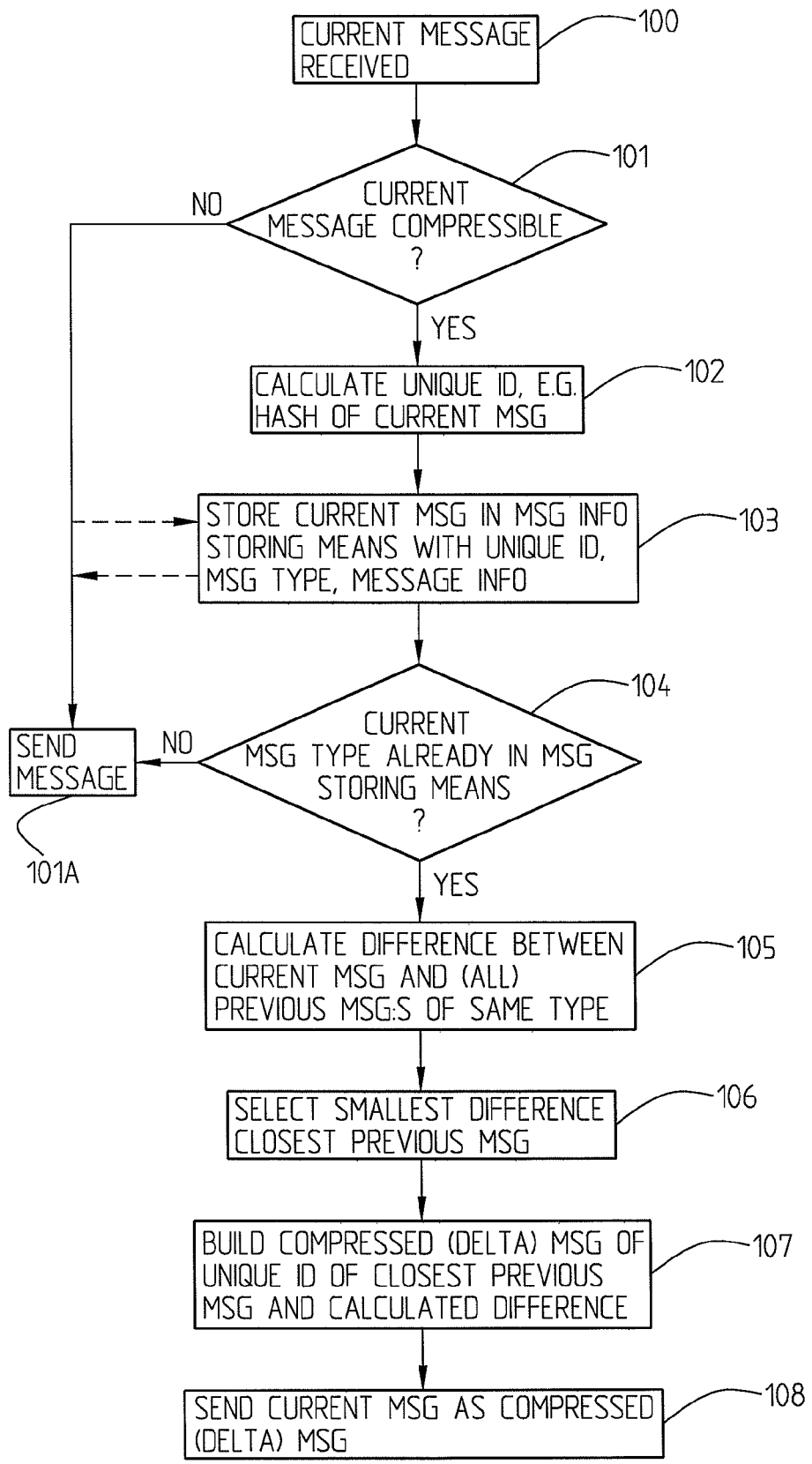
FIG. 7 is a flow diagram illustrating one example of the steps of the flow in a node acting as a sending node.

FIG. 7 is a flow diagram describing the receiving concept of the present invention which proposes a method to improve control plane signalling performance by leaving the existing protocol intact as seen from the subsystems and introducing syntax based compression of signal flow which is transparent for the sending and the receiving system components. The invention is actually based on the observation that control plane signalling, for larger systems, usually is governed by some kind of syntax and that for reasons of design rules and design robustness, transmitted information often is redundant and repetitive. Thus, according to the invention the syntax of the control plane signalling is used to compress the control plane signals and a signal cache (for example) is built up which allows sending of shorter difference, or delta, signals instead of complete signals. Moreover, preferably a dynamic or static selection algorithm is used to select messages which are likely to be well compressible, or messages which it is advantageous to compress in that the savings in e.g. bandwidth are high.

Hence, in FIG. 7 it is supposed that a message is received, 100, in a node acting as a sending node. It is supposed that the message is denoted current message. Then it is determined whether the message to be transmitted is compressible or not, 101. This can be done in many different ways. In one implementation all messages are considered as compressible. A list may also be provided stating which message types that are compressible. Still further an algorithm may be used to select compressible messages, for example based on length and/or type. If however, it is determined that the message is not compressible, the current message is sent as a conventional message, 101A. If, however, it is determined that the message is compressible, a unique identity is assigned to the message, 102, in this particular implementation a hash value is calculated for the message. The message, i.e. the current message, is stored in message information storing means, with a unique identity, e.g. a hash value, the message type, and message information, or the message body, 103. Then it is established whether the current message type already is present in a message storing means, 104, i.e. if there already are one or more messages of the same type stored in the storing means. If not, the message is sent as it is, 101A. If however there are messages of the same type as the current message, differences are calculated between the current message and such already existing, also denoted previous, messages, 105. This can be done in different manners, differences between the current message and all such previous messages may be calculated, or some particular criteria can be given such that if a difference is found and the difference is small enough, no further calculations are performed etc. In any case, somehow a previous message is selected, 106, for example the previous message with the smallest difference from the current message, i.e. the closest previous message. Then the compressed message or a delta message is built as the unique identity of the closest previous message, or of the preferred message, and the calculated difference, 107. Then the in this way assembled current message is sent as a compressed or delta message, 108.

Figure 8:
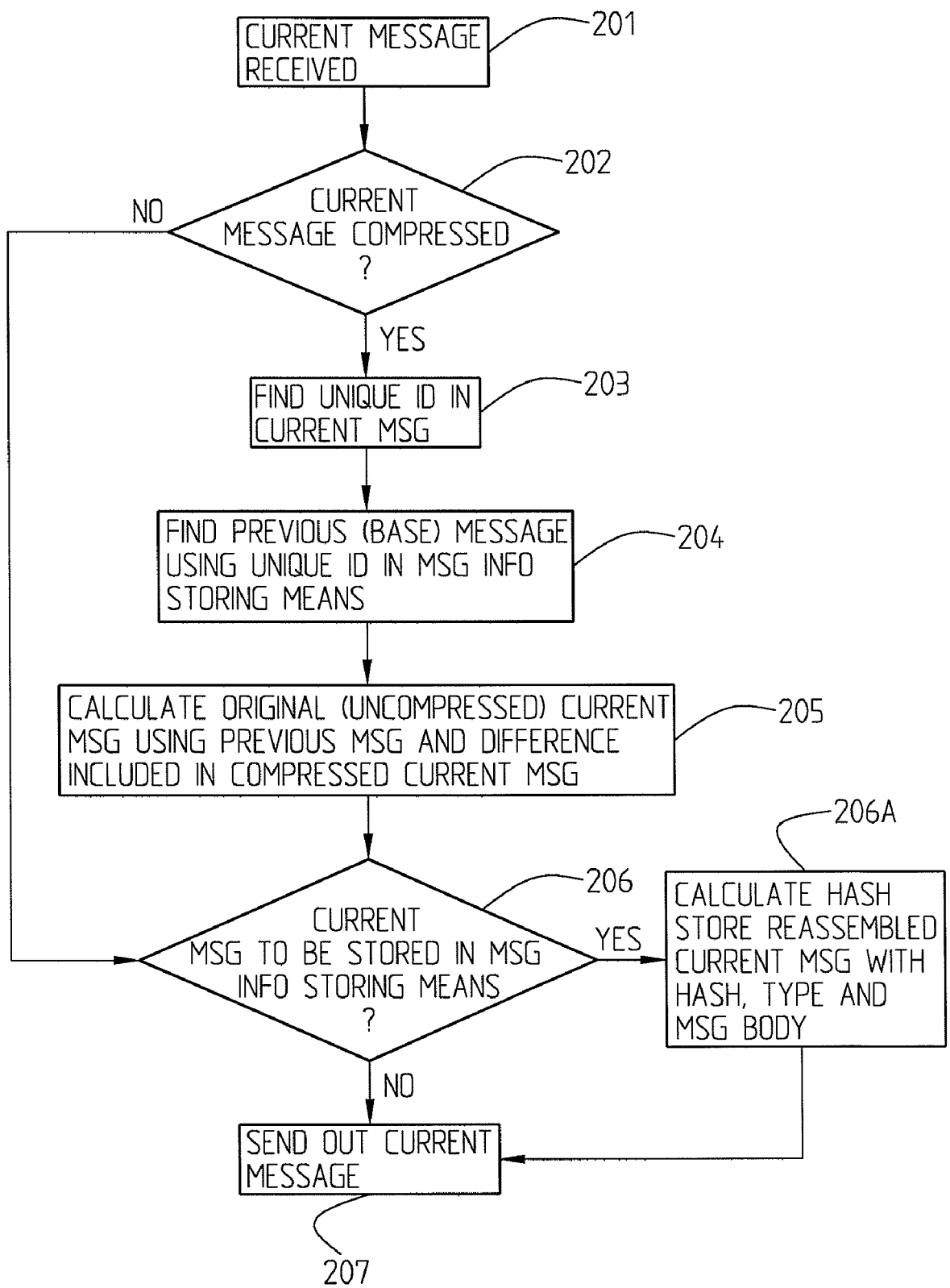
FIG. 8 is a flow diagram illustrating one example of a procedure when a node acts as a receiving node.

FIG. 8 is a flow diagram schematically describing the procedure for message decompression, i.e. decompression of a message received in a receiving node. Hence, it is supposed that a current message is received, 201, from lower layers. It is then established or detected if the current message is compressed or not, 202. If it is not compressed, it is established whether it is to be stored in the message information storing means, 206, and then the current message is forwarded to higher layers, 207. If it is established that the message is compressed, the unique identity is found in the compressed, delta, message, 203, and using the unique identity, the previous or base message and the difference included in the compressed current message is used to calculate the original, (un-compressed) current message, 205. Then, preferably, it is established if the current message is to be stored in message information storing means, 206. If not, it is passed on to higher layers, if yes, a hash value is calculated and the assembled current message is stored with hash, type and the message body, 206A. Then the message is sent out. The criteria used to determine whether a message is to be stored or not can be of many different kinds, a message may be stored due to a sender request or algorithm parameters. For example a number may be given to indicate how many messages that are to be stored, for example the 100 latest messages can be stored etc. It should be clear that the concept can be varied in a number of ways, different criterias may be used for selecting compressibility or for storing into storing means etc.

The procedures described above considerably reduce the load related to sending and reception of control plane signalling, but adds a memory and CPU time consuming processing step to the sending and receiving subsystem. This means that advantageously an a-priori or a dynamic selection of which messages are to be processed by the inventive concept can be provided for, as well as the memory available for message cache needs to be provided for or taken into consideration. Generally, the more parameters a message carries, the larger the optimization potential will be. The message cache could be dimensioned to only hold one or a very few disparate messages of each type. Moreover, if computing power and memory are available but communicating capacity, for example via an air interface, is limited, the inventive concept is potentially very efficient. However, also other factors may be taken into consideration or be disregarded etc.

Figure 9:
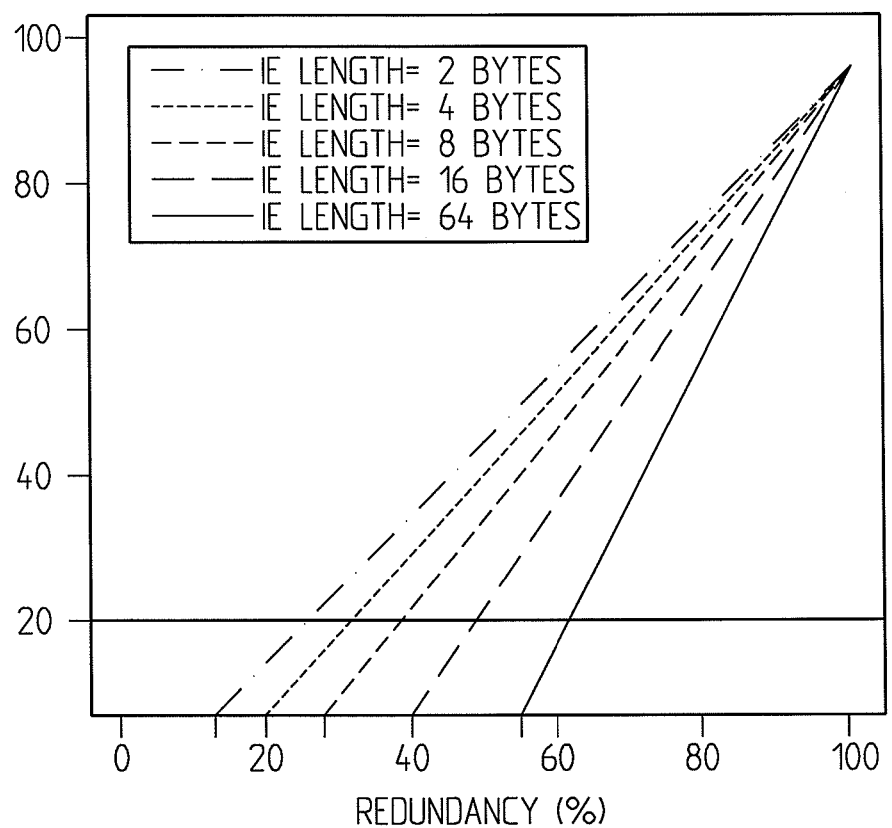
FIG. 9 is a diagram illustrating simulated results for saving as a function of redundancy and for a given message length.

FIG. 9 is a diagram illustrating a simulation for a simple model showing savings as a function of redundancy and information element (IE) length for a message length of 100 bytes. It is here assumed that the overhead for messages is 4 bytes and the overhead for the writing commands is 2 bytes per command. As can be seen the savings increase with an increasing redundancy.

Figure 10:
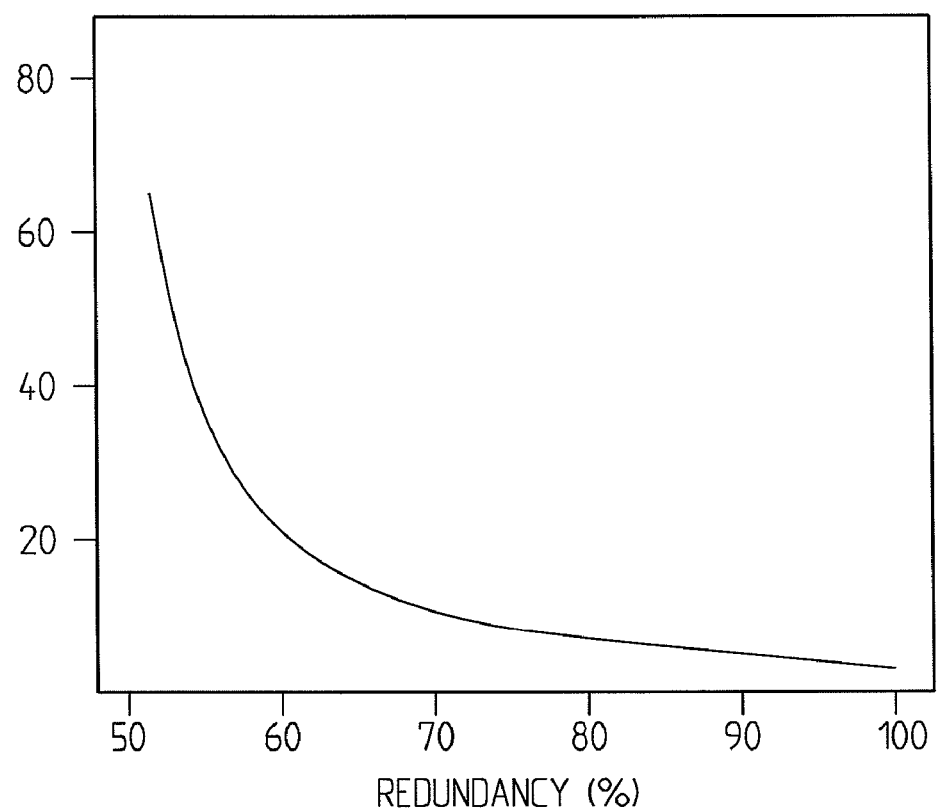
FIG. 10 illustrates the message length and redundancy for 20% savings with a given information element length.

FIG. 10 shows redundancy versus message length to achieve 20% savings in message sending. Generally the possibilities or the benefit of a message compression increases considerably with an increasing message length. In FIG. 10 the message length and redundancy is shown for an information element length of 4 bytes. Generally it is much more beneficial to compress longer messages than shorter messages.

In a preferred implementation it is provided for storing means, or particularly cache, coherency which means that mechanisms are introduced to secure cache coherency on a sending and on a receiving side. Still further, in an advantageous implementation an error handling mechanism is provided for in order to handle the situation of unexpected cache incoherency.

Further for the difference calculation, computational activity may be more important than minimizing the size of the calculated difference information.

It should be clear that the invention can be varied in a number of ways and applied to different kinds of senders and receivers, one-directionally or two-directionally. Further it can be implemented in many different manners using different algorithms and storing means and be based on different criterias for selection of compressibility and for selection of closest message etc. Also in other aspects the invention is not limited to the explicitly illustrated embodiments but it can be varied in a number of ways within the scope of the appended claims.

The invention claimed is:

1. An arrangement for handling control signal messaging in a distributed system having a number of sending nodes and a number of receiving nodes for implementing a control signalling communication protocol, wherein at least a number of said sending and/or receiving nodes comprise:

a message compression selection means for, based on one or more criteria, determining or selecting which messages are to be compressed;

a message compression means for compressing selected messages, said message compression means being adapted to use the syntax of the control signalling for compression;

a unique identity assigning means for at least assigning messages which are to be compressed with a unique identity;

a message information storing means, in which at least some messages are sorted depending on type, under the assigned unique identity;

message recognition means for recognizing previous messages of the same type; and a message distinguishing means for establishing the difference portion(s) between one or more previous message and a current message of the same type, and in that the sending and/or the receiving node is adapted to send and/or receive the current message as a compressed message comprising only the difference portion between a selected or preferred previous message and the current message and the unique identity of said selected or preferred previous message.

2. The arrangement according to claim 1, wherein the unique identity assigning means further comprises an identity calculation means for calculating unique identities comprising hash values.

3. The arrangement according to claim 1, wherein the message information storing means further comprises means for establishing and storing message type description information based on message syntax and for linking each message to such message type description and the message distinguishing means comprises calculating means for calculating the difference between any or given previous messages and a current message to be sent and in that criterion defining means are provided for giving or keeping criteria concerning amount and type of difference allowing sending as a compressed message.

4. The arrangement according to claim 3, wherein the criteria at least contain a difference amount criteria indicating the criteria for admitting only the difference being adhered to a previous message unique identity for sending as a compressed message.

5. The arrangement according to claim 3, wherein the message distinguishing means for establishing the difference between the current message and at least some previous messages which are of the same type as the current message and about which information is stored in the message information storing means, are adapted to select a preferred previous message being the message between which and the current message the difference is the smallest.

6. The arrangement according to claim 3, wherein it further comprises message reconstruction means provided at least in a receiving node for decompressing a received compressed message by mapping a received unique identity to the corresponding previous message using the information in the message information storing means and adding the received difference to said previous message, and message storing decision means for establishing when or if information concerning a message is to be stored in the message information storing means.

7. The arrangement according to claim 3, wherein the message distinguishing means comprises difference calculation means for performing a message difference calculation based on a syntax representation of a current message and one or more previous messages.

8. A node in a distributed communication system adapted to at least act as a sending node sending control signalling messages to other nodes and implementing a control signalling protocol, comprising:
- a control signal message compression means;
- a message compression selection means for determining or selecting, based on one or more criteria, which messages are to be compressed;
- said control signal message compression means being adapted to use the syntax of the control signalling for compression of selected control signal messages;
- a message information storing means;
- a message unique identity assigning means for providing a message to be stored in the message information storing means with a unique identity, the message information storing means comprising a table in which messages are sorted depending on message type, by means of the assigned unique identity and wherein each message is linked to a message type description; and
- a message recognition means and message distinguishing means for recognizing messages of the same type as a current message, and for establishing the difference portion(s) between a current, new, message and a number of previous messages of the same type, and in that it is adapted to, if one or more given criteria are met, send a current message as a compressed message comprising only the difference portion(s) between the current message and a selected previous message and the unique identity of said selected previous message.

9. The node according to claim 8, wherein the message compression selection means comprises a selection algorithm which is static or dynamic.

10. The node according to claim 8, wherein the message information storing means comprises a cache.

11. The node according to claim 8, wherein the unique identity assigning means further comprises unique identity calculating means for calculating a hash value for each message to be given a unique identity and that said message type descriptions are based on message syntax and in the said message information storing means comprises means for linking each message to a message type description.

12. The node according to claim 8, wherein the message distinguishing means comprises calculating means for calculating the difference between a current message and any or at least given or a given number of previous messages of the same type and in that criterion defining means are provided to give or keep criteria concerning amount and/or type of difference that is required to determine whether a message can be sent as a compressed message or not or when difference calculation is to be interrupted, the message compression means being adapted to, if or when the given difference criteria are met, adding the difference to the unique identity of the corresponding selected or preferred previous message and sending the message as a compressed message comprising the difference and the unique identity of the selected previous message, the selected or preferred previous message being the or one of the messages differing the least from the current message.

13. The node according to claim 8, further comprising a message reconstruction means communicating with a detection means for detecting a received compressed message and decompressing means mapping the unique identity of a received compressed message to the appropriate previous message using said message information storing means, and adding the difference to said previous message.

14. A method for sending a control plane signalling current message from a first, sending, node or subnode to a second node or subnode in a distributed communication system implementing a control plane signalling communication protocol, comprising the steps of, in the sending node:
- determining or selecting, based on a number of given decision criteria, if the current message is compressible, if not, sending the message, if yes;
- establishing a unique identity for the message;
- storing the message unique identity, the message type and the message content description in message information storing means;
- establishing if there is any entry in the message information storing means relating to any previous messages of the same type as the current message, if not, sending the message, if yes;
- calculating the difference between the current message and one or more previous messages of the same type;
- selecting, based on given selection criteria, a previous message;
- generating a compressed message comprising the unique identity of the selected previous message and the difference between the current message and the selected, e.g. closest, previous message; and
- sending the compressed message.

15. A method of receiving a control plane signalling current message from a first sending node in a second, receiving, node in a low transport layer of an implemented control plane signalling protocol, in a distributed communication system, wherein the receiving node comprises a message information storing means in which previous messages are stored organized depending on message type under unique identities uniquely identifying each message, and in that it comprises the steps of:
- receiving a current message;
- establishing if the message is compressed, if yes;
- establishing the unique identity in the compressed message;
- using the unique identity to find the corresponding previous message in the message information storing means;
- decompressing the compressed current message using the previous message and the received difference using a the syntax based message type description in the storing means, by adding the difference to the previous message;
- establishing based on predetermined criteria if the current message is to be stored in the message information storing means, if not, sending the message to a higher protocol layer, if yes;
- establishing a unique identity of the current message, and storing the message with message type and unique identity into the message information storing means, and passing the current message to a higher protocol layer.

* * * * *

UNITED STATES PATENT AND TRADEMARK OFFICE
CERTIFICATE OF CORRECTION

PATENT NO. : 7,746,880 B2
APPLICATION NO. : 12/093282
DATED : June 29, 2010
INVENTOR(S) : Wartenberg It is certified that error appears in the above-identified patent and that said Letters Patent is hereby corrected as shown below:

In Column 5, Line 13, after "message." delete "p".

In Column 5, Lines 13-34, delete "The invention also discloses a..................sending the compressed message." and insert the same at Line 15, as a new Paragraph.

In Column 5, Line 15, delete "rom" and insert -- from --, therefor.

Signed and Sealed this

Twelfth Day of October, 2010

David J. Kappos
*Director of the United States Patent and Trademark Office*